United States Patent [19]

Jachimowicz

[11] 4,031,310

[45] June 21, 1977

[54] SHRINKABLE ELECTRICAL CABLE CORE FOR CRYOGENIC CABLE

[75] Inventor: Ludwik Jachimowicz, Elizabeth, N.J.

[73] Assignee: General Cable Corporation, Greenwich, Conn.

[22] Filed: June 13, 1975

[21] Appl. No.: 586,561

[52] U.S. Cl. .............................. 174/15 C; 174/15 S; 174/130

[51] Int. Cl.² ...................... H01B 7/34; H01B 12/00

[58] Field of Search ................ 174/15 C, 15 S, 13, 174/130, 108, 109, 107, 126 S, 128 S

[56] References Cited

UNITED STATES PATENTS

| | | | |
|---|---|---|---|
| 3,514,524 | 5/1970 | Buchhold | 174/130 X |
| 3,515,793 | 6/1970 | Aupoix et al. | 174/13 |
| 3,541,221 | 11/1970 | Aupoix et al. | 174/13 |
| 3,634,597 | 1/1972 | Ziemek | 174/115 |
| 3,643,002 | 2/1972 | Minnich | 174/15 S |
| 3,730,966 | 5/1973 | Aupoix et al. | 174/128 S |
| 3,749,811 | 7/1973 | Bogner et al. | 174/126 S |
| 3,864,508 | 2/1975 | Beck | 174/15 S |

FOREIGN PATENTS OR APPLICATIONS 554,581 6/1932 Germany ......................... 174/115

Primary Examiner—Arthur T. Grimley
Attorney, Agent, or Firm—Roy C. Hopgood; John M. Calimafde; Eugene J. Kalil

[57] ABSTRACT

This invention is a cable core made of two layers of helically wound strips of metal with one layer having a right hand lay and the other layer having a left hand lay. The angle of lay is such that the diameter of the core changes at a faster rate than the length of the strips change with differences in temperature. This increase in the change of the core diameter makes the change correspond more closely to that of a plastic jacket or insulation that surround the core and thus avoids excessive stresses in the insulation as it cools and resulting cracking of the insulation in the case of substantial changes in temperature. The angle of lay of one layer is different from that of the other layer so as to set up restraint conditions that provide stability for the composite construction.

9 Claims, 5 Drawing Figures

U.S. Patent   June 21, 1977   4,031,310
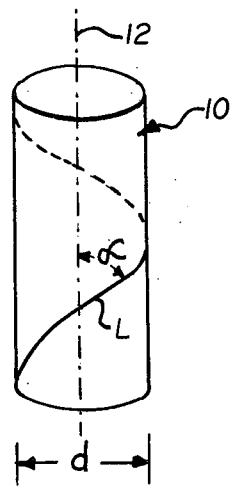
FIG. 1.
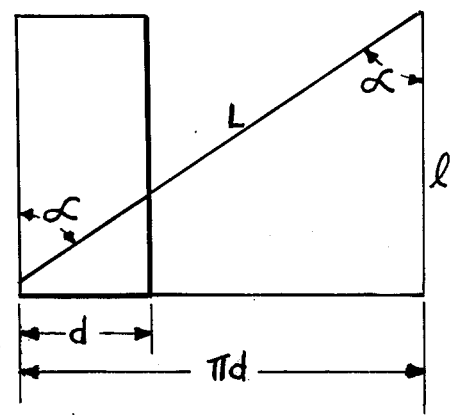
FIG. 2.
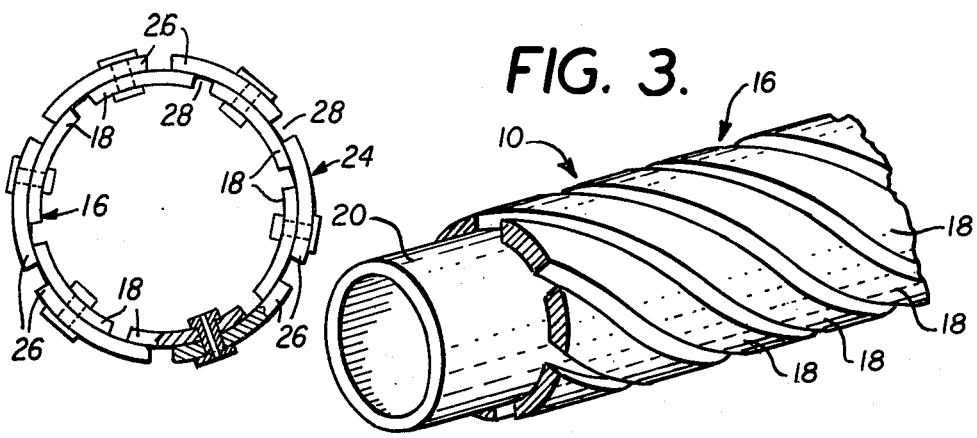
FIG. 5.
FIG. 3.
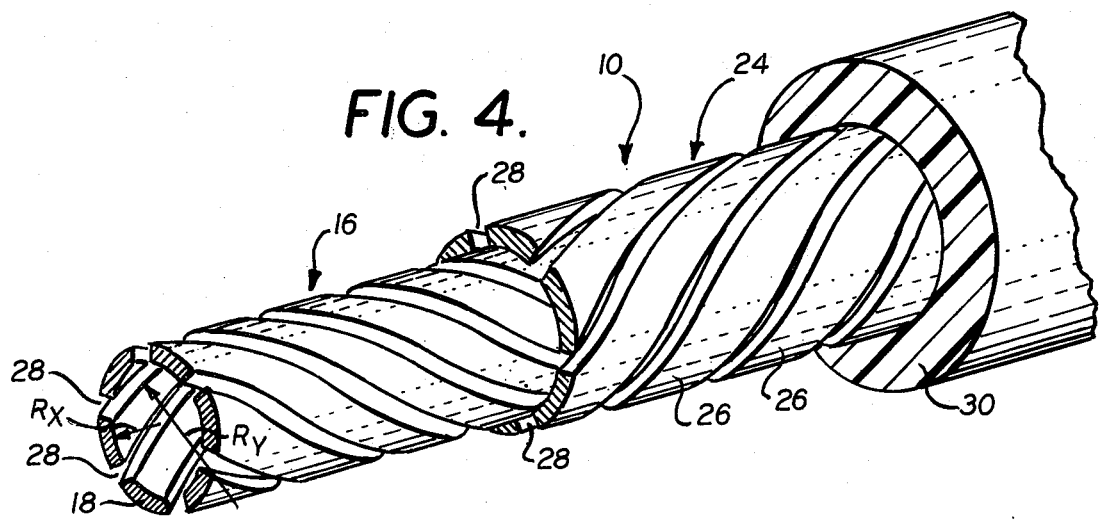
FIG. 4.

SHRINKABLE ELECTRICAL CABLE CORE FOR CRYOGENIC CABLE

BACKGROUND AND SUMMARY OF THE INVENTION

The cable core of this invention is for use in 20 hollow core cables through which oil or other fluid can be circulated for cooling the cable or for other purposes. The core is made of at least two layers of strips, preferably metal, which extend along helical courses with the angle of lay calculated so as to obtain a desired correlation between changes in the length of the metal strips and changes in the diameter of the core.

Because of the fact that plastic, such as is generally used for insulation or for jacketing around electrical cables, changes in dimension much more than metal such as is commonly used for shielding electric cables, provision has to be made to accommodate these differences in thermal expansion and contraction. If a metallic cable core or shield changes in diameter in direct proportion to the change in length of metal with a given temperature change, and the temperature change is substantial, then a plastic layer or jacket over the metal will be prevented from contracting to its full extent; and thermal stresses will be set up in the plastic which cause the plastic to crack when the stresses reach a critical value.

This invention provides a construction in which the diameter of the core contracts at a greater rate than the metal changes in length as the temperature of the metal changes. The change in core diameter can be made to more nearly approach the change in plastic jacket diameter for corresponding changes in temperature. Thus a hollow core cable made in accordance with this invention can be operated through a much wider temperature range without setting up destructive thermal stresses in a plastic jacket which is placed over the metal core.

For simplicity and economy, the cable core of this invention is made in such a way that the two layers of metal strips, which comprise the core, are related to one another in such a way as to provide a stable structure. This is done by providing the strips of each layer with a different direction of the helix. One helix is a right hand helix and the other is a left hand helix. If they unwind, therefore, they must rotate in opposite directions. The strips are then connected to one another at the ends of the core so that any tendency of either helix to unwind is offset by the other helix.

In addition to the right hand and left hand helixes, further stability of structure is obtained by having a different angle of lay for each helix so that their diameters do not change by equal amounts for a given change in temperature. In the preferred construction, the diameter of the outer layer changes less than that of the inner layer for a given temperature change; and thus the outer layer acts as a restraint on the inner layer when the temperature of the core increases.

With decrease in temperature, the inner layer contracts more than the outer layer and its pressure against the outer layer decreases with resulting decrease in friction between the layers at lower temperatures. The differences in diameter changes of one layer with respect to the other is kept at a low value so that the helical layers of strips of the two layers support each other back-to-back at all times.

The characteristics of the strips that make up the two layers of the core provide, within desired limits, provision for freedom of expansion and contraction and restriction of movement in opposite directions beyond the original state obtained by the judicious selection of characteristics of the interrelated helixes.

Another feature of the invention is the method of making the hollow cable core of this invention by winding the layers of strips of the hollow core on a "disappearing mandrel" which permits the making of cores of a thousand to two thousand feet in length which can be wound on a reel and from which core a tube mandrel could not be pulled out by any conventional means.

Other objects, features and advantages of the invention will appear or be pointed out as the description proceeds.

BRIEF DESCRIPTION OF DRAWING

In the drawing, forming a part hereof, in which like reference characters indicate corresponding parts in all the views;

FIG. 1 is a diagrammatic view showing a length of the cable core equal to the axial length of one convolution of the helix of the inner layer and showing the way in which the helix advances as it circles around the circumference of the core;

FIG. 2 is a diagrammatic view showing the development of a portion of the circumference of the structure shown in FIG. 1 to form a triangle having sides corresponding to the circumference of the core, the length of a helix convolution and the axial length of a helix convolution;

FIG. 3 shows a first layer of the cable core wound around a "disappearing mandrel";

FIG. 4 shows a portion of the length of the first layer shown in FIG. 3 with a second layer wound over it and with an outer plastic jacket; and FIG. 5 is an enlarged, end view of the cable core, partly broken away and in section, and with the outer jacket omitted to permit the structure shown to be on a larger scale.

DESCRIPTION OF PREFERRED EMBODIMENT

FIG. 1 shows a cylindrical portion of a cable core 10 with a line L which represents an edge of one convolution of a helix of one of the strips used to make the core. The diameter of the core is represented by the letter $d$; and the angle of lay of the line L is indicated by the reference character $\alpha$, this angle being that made by the intersection of the line L with a line 12 extending parallel to the axis of the core and passing through the line L.

FIG. 2 shows a development of the surface of the core 10 on the plane of the paper and with the length of the lay, in an axial direction, indicated by the reference character 1. The other leg of the triangle is indicated by the reference character $\pi d$ which is the circumference of the core having the diameter d.

FIG. 3 shows a first layer 16 of the core 10 consisting of six individual metal strips 18 wound in helixes around a disappearing mandrel 20 which will be described subsequently. The strips 18 are preferably made of metal and are preferably of equal width. Each strip covers a portion of the circumference of the mandrel 20 and in the construction shown there is space between the adjacent strips 18 for circulation of fluid which is used in the core for cooling or other purposes.

The thickness of the strips 18 is greatly exaggerated in the drawing for purposes of clearer illustration. In practice a core of 0.75 inches inside diameter can be made with strips 18 having a thickness of 0.01 inches; these figures being given merely by way of illustration. The material of which the strips 18 are made depends upon whether or not they are to serve as conductors of electricity in addition to their function as sides of the hollow core. They can be made of bronze, aluminum or copper; and if they are to serve as electrical conductors, they should be made of metal having a desired conductivity.

FIG. 4 shows the inner layer 16, on a somewhat smaller scale than in FIG. 3, and with the mandrel 20 removed. Each of the strips 18 has two curvatures. It has a curvature about the longitudinal axis of the core and this radius of curvature is indicated by the dimensional line $R_x$. The second radius of curvature of each of the strips 18 is the curvature which results from the extension of the strip around a convolution of the helix. This radius of curvature will depend, of course, on the lay of the helix in addition to the radius of the mandrel and in FIG. 4 the helical curvature is represented by the dimensional arrow $R_y$.

FIG. 4 also shows a second layer 24 which is wound over the first layer 16 with a left hand lay in contrast to the right hand lay of the first layer 16. The individual strips of the second layer 24 are indicated by the reference characters 26, and these strips are similar to the strips 18 except that they are slightly wider because of their greater radius from the axis of the core. This difference in circumferential width of the strips 18 and 26 is exaggerated in FIG. 4 because of the exaggeration of the strip thicknesses.

The gape 28 between the individual strips of the respective layers cross over one another at frequent intervals because of the difference in the direction of lay of the different layers and this permits circulation of fluid from the interior of the core through the gaps in the first layer and into the gaps of the second layer There is a plastic jacket 30 over the outer layer 24. This jacket 30 is representative of additional cable structure which surrounds the core 10. This additional structure may include a plastic tape folded around the core longitudinally or wrapped helically; extruded insulation over the tape and any other shielding or jacketing which is conventional with electric cables. Fluid circulating through the core, including the spaces or gaps 28, contacts with this jacket 30 and can be used for cooling the jacket.

In order to have precise dimensions for the inner and outer layers of the cable core, it is necessary that they be originally wrapped about a supporting mandrel. The mandrel 20 is shown in FIG. 3 as a hollow tube. In order to make this mandrel a "disappearing mandrel" which can be removed from the core after the core is wound on a reel, the mandrel 20 is preferably made of a low melting point material or a material which can be dissolved in weak acid that will not affect the metal from which the core is made. A mandrel made of material which melts at a substantially lower temperature than the material of the core can be removed from the core by applying the necessary heat and letting the melted mandrel run out at the end of the core. If the mandrel is dissolved in a weak acid, which does not affect the material of the core, then the mandrel can be removed by permitting the acid to flow out at the discharge end of the core.

In order to have stabilization of the core dimensions, it is important to prevent unravelling of the layers. As previously explained this is done by having the strips of the different layers wrapped around the mandrel in opposite directions and the strips locked together at the ends. The clockwise torque of one layer is opposed by the counter clockwise torque of the other layer, as previously explained, and the structure is stable.

There is, however, one other possibility for creating instability. If the core is pulled it will elongate and the diameter shrink. To guard against premature elongation of the core, the strips are preferably made of hard metal and preformed into helixes with elastic deflections still left in the metal, so that unless a shrinking force is applied to the strips, the cable core does not collapse. Following a cooling cycle, when the core is brought back to its original temperatue, the helix should expand to the original diameter.

It is a feature of the preferred embodiment of this invention that the angle of the helixes of the inside and outside layers are made different from one another. The core is constructed so as to have freedom to increase to some extent in length, but no freedom to decrease in length and thereby expand axially beyond the original diameter. Also, when a reasonably mild force is applied axially in the direction to shorten the length of the core axis the core should not yield axially and increase in diameter.

As an illustration of the way in which this stability feature is worked out, reference should be made to FIG. 2 and to the following equations which are used for a core having an inside diameter of 0.75 inches and two layers of strips, each of a thickness of 0.04 inches; the outside diameter of the core being approximately 0.91 inches. The metal strip shrinks 0.3% in cooling by the fluid that circulates through the core and the desired reduction in core diameter is 1% to accomodate the shrinkage of the plastic jacket which surrounds the core. The length of the core is intended to be constant. The appropriate equations as applied to FIG. 2 are as follows:

1. before cooling
$$l^2 = L^2 - (\pi d)^2$$

3. after cooling the length of cable axis is required to remain constant and L shrinks to the length $aL$, ($a < 1$) and diameter to $bd$, ($b < 1$).

The equation is
$$l^2 = (aL)^2 - (l\pi d)^2 \text{ subtracting and re-arranging}$$

$$\frac{1 - A^2}{1 - l^2} = \sin^2\alpha \qquad (1)$$

For example for $a = 0.997$ (0.3% shrinkage of strips) and $b = 0.99$ (diameter shrinkage 1%), as requested by example, the angle of helix 60 = 33.778°. If relative shrinkages $a$ and $b$ are different from above, the angle will be appropriately different. The equations controlling restriction of freedom of core to contract are as follows:

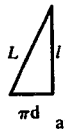

In this operation, the length of the strip "L" is constant.

(1) $L^2 = (\pi d)^2 + l^2$ (2) $L^2 = (m\pi d^2) + nl^2$, $m > 1.0$, $n < 1.0$ and $$\frac{n^2 - 1}{1 - M^2} = tg^2 \alpha$$

If we will decide that the inner layer of strips, in the example quoted above, will be made with such helix angle that for 0.3% shrinkage of the metal strips, the diameter shrinks 2%, (diameter of outer layer shrinks 1%) then the angle of the helix will be from equation (1) above.

$$Sin^2 = \frac{1 - 0.997^2}{1 - 0.98^2} \quad \alpha = 22.88°$$

Now, if the inner layer is by some external force urged to shrink 1% then from the equation (2)

$$tg^2 22.88° = \frac{0.99^2 - 1}{1 - m^2}$$

"$m$" for the inner layer = 1.04713. However for the outer layer made with angle of helix $\alpha = 33.77°$ the $m$ = 1.0297.

It follows that if expanding "spring" force of the inner layer, or an outside force applied to the core, will tend to shorten the core axis with the result of increasing the diameter of the inner layer by 4.73%. The outer layers at the same shrinkage of cable axis may yield only 2.97%. To accomodate the 4.73% required by the inner layer, the strips of the outer layer have to elongate (from equation (1)) 1.01%.

This, however, will not occur since this would require a force to elongate the strips of the outer layers. The force is much in excess of what inner layer (spring) can ever exert.

In this way the expansion of the outer layer, beyond a small fraction of 1%, will be prevented by the ingenious selection of the helix angle of the inner layer.

There is, however, no restriction on the freedom of movement of cable core components in the desired direction. At shrinking of strips, due to cooling of the core, after overcoming small, but still positive force of the spring of the inner layer, this layer will shrink in diameter somewhat faster than the outer layer, allowing the outer layer free decrease in diameter. The clearance between layers will be neglible ( 1% of diameter of core at the extreme). With the cable core warming up to the room temperature, the expanding inner layer under this "spring action" will press against outer layer contributing to the restoration of the original diameter of the core.

The preferred embodiment of the invention has been illustrated and described, but changes and modifications can be made, and some features can be used in different combinations without departing from the invention as defined in the claims.

What is claimed is:

1. A cable core construction for a cryogenic electrical cable including in combination an inner metal strip having a helical lay of a predetermined angle and with successive convolutions spaced from one another, an outer metal strip having a helical lay with its angle of lay in the opposite direction and with successive convolutions spaced from one another, whereby the angle of lay of one strip is a right hand helix and the angle of lay of the other strip is a left hand helix, the outside surfaces of the convolutions of the inner strip being immediately adjacent to the inside surfaces of the convolutions of the outer strip for mutual support of one another, means fastening the inner and outer helixes to one another at both ends of the cable, and a plastic insulating jacket for the cable extending around the outside circumference of the outer helix.

2. The cable core construction described in claim 1 characterized by the outer helical strip being supported by the inner helical strip and the inner helical strip being confined by contact with the outer strip, both of the strips being made of resilient metal that springs back to its original helical diameter when the temperature rises after the diameters of the helixes have been reduced by thermal contraction of the helical length of the strips.

3. The cable core construction described in claim 1 characterized by a plurality of outer strips forming an outer layer, and a plurality of inner strips forming an inner layer; the width of each strip of each layer extending for only a portion of the circumference of the helix at any section thereof; and the combined annular extent of all of the strips of each layer being less than 360° of the circumference of the helix whereby there is space between adjacent strips for circulation of fluid through the sides of both helixes.

4. The cable core construction described in claim 1 characterized by the space surrounded by the inner helical strip having open space extending continuously lengthwise of the cable for the passage of fluid along the length of the cable, and said space being free of obstructions that would prevent reduction in the helix diameters in response to thermal contraction of the helical strips.

5. The cable core construction described in claim 1 characterized by electrical and heat insulating material surrounding the helical strips of the cable core, the insulation material having a coefficient of thermal expansion greater than that of the metal of the strips, the angle of lay of the helix of each strip being coordinated with the difference in coefficient of expansion of the metal and the insulating material to reduce the diameter of the helixes as the metal contracts and thereby relieve the shrinkage stresses in the insulating material to a value below the elastic limit of the insulating material.

6. The cable core construction described in claim 5 characterized by the insulating material including a plastic sleeve that contracts circumferentially to exert a radial pressure on the helical metal core as the cable cools.

7. The cable core construction described in claim 1 characterized by the angle of lay of the helical strips of the inner and outer layers being somewhat different from one another so that the core formed by the two helical strips cannot expand its diameter in response to mild force applied axially in a direction to contract the helix axially with resulting expansion of the diameter of the core.

8. The cable core construction described in claim 1 characterized by the strips being resilient with the clockwise torque of one layer opposed by the clockwise torque of the other layer whereby the structure is stable.

9. The cable core construction described in claim 1 characterized by the confronting faces of the helixes contacting with one another and supporting one another back-to-back.

* * * * *